Figure 1:
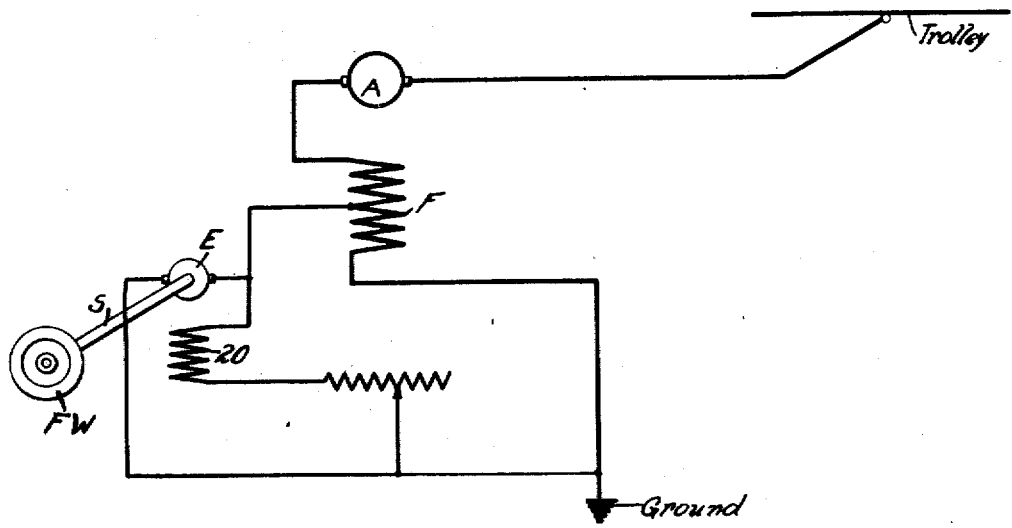

R. E. HELLMUND.
CONTROL SYSTEM.
APPLICATION FILED JAN. 5, 1918.

1,318,755.

Patented Oct. 14, 1919.

WITNESSES:
J. T. Wurmb
W. R. Coley

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,318,755.  Specification of Letters Patent.  Patented Oct. 14, 1919.

Orginal application filed September 25, 1914, Serial No. 863,504. Divided and application filed November 7, 1917, Serial No. 200,655. Divided and this application filed January 5, 1918. Serial No. 210,525.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application, Serial No. 200,655, filed November 7, 1917, which is a division of an application that matured into Patent No. 1,249,954, dated December 11, 1917.

My invention relates to systems of control, and it has special reference to means for preventing the occurrence of "flash-over" conditions in dynamo-electric machines, more particularly electric railway motors, under predetermined conditions.

One object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deënergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide means for obviating the above-mentioned operating difficulties by energizing a part or all of the main field windings from some auxiliary source of energy when the supply-circuit energy is temporarily interrupted. The main field flux is thus maintained at a predetermined value during the interruption and, as a result, when the supply-circuit energy is resumed, the predominance of armature ampere-turns over field ampere-turns is prevented, and "flash-over" conditions do not obtain. In one form, my invention comprises the use of a small auxiliary motor-generator or dynamotor, driven from the supply circuit, for energizing a predetermined part of the field winding. In this case, the motor end of the auxiliary machine is also deënergized upon an interruption of the connection to the supply circuit; however, if the machine is provided with a fly-wheel or inherently has considerable fly-wheel effect, the energization of the main field winding from the generator end of the machine will be maintained for a predetermined period. Longer energy interruptions may be provided for by means of suitable automatic devices for switching in an independent source of energy to supply current to the main field winding at the end of the said period.

Figure 2:
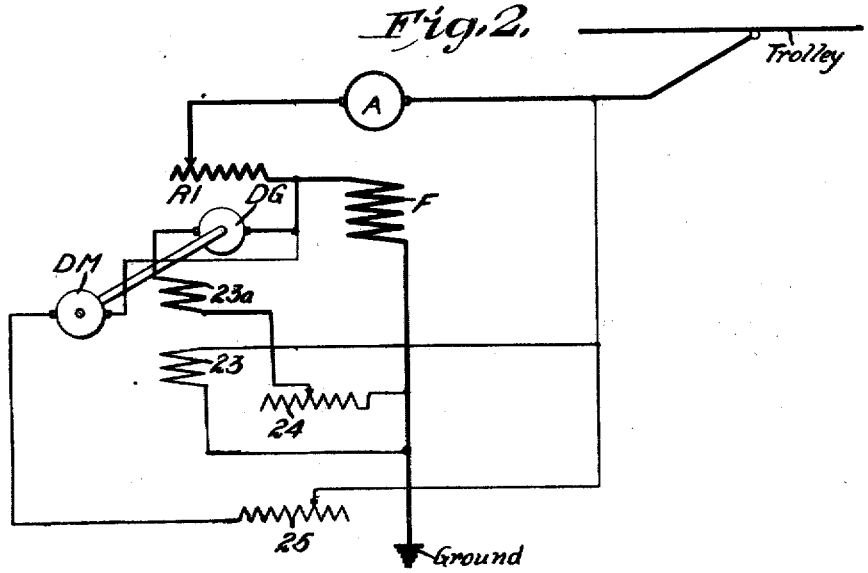

In the accompanying drawing, Figure 1 is a diagrammatic view of a system of control embodying my invention; and Fig. 2 is a similar view of a modification of the invention.

Referring to Fig. 1 of the drawing, the system shown comprises a supply-circuit conductor marked "Trolley." a return circuit conductor marked "Ground," and an electric motor having an armature A and a field magnet winding F of the series type.

Fig. 1 further comprises a small dynamo-electric machine E that is connected across a predetermined part of the main motor field winding, and is provided with a variable shunt field winding 20 and a fly-wheel FW. While the main motor is operating normally, the machine E will be driven from the field-winding voltage as a motor. Upon interruption of the supply-circuit energy, the flywheel effect of the machine E will keep it running as a generator to excite the main winding for a predetermined period of time. When the supply-circuit energy is shortly resumed, the field ampere-turns will thus immediately be of a normal or other predetermined value, irrespective of the slow building up of the field flux by the motor current. The predominance of armature ampere-turns over field ampere-turns is prevented in this way, and flash-over conditions do not obtain.

The system illustrated in Fig. 2 comprises a suitable supply circuit, the main motor having the armature A and the field winding F, a main circuit variable resistor R1, and a dynamotor having a motor armature winding DM, a generator armature winding DG, a shunt-connected field winding 23, and a field winding 23ª that is connected in series with the generator armature DG and a variable resistor 24 across the main field winding F. The dynamotor may be connected in series with a variable resistor 25. The dynamotor field windings 23 and 23ª are disposed to act differentially under emergency conditions.

The operation of the system under consideration may be briefly set forth as follows: When the main motor is being accelerated by varying the resistor R1, in accordance with customary practice, a portion of the main current traverses the generator armature winding DG and the associated field winding 23ª, the field windings 23 and 23ª thus being adapted to aid each other to produce a relatively strong field flux in the dynamotor, thereby causing it to run at a relatively slow speed. In case of interruption of the supply-circuit energy, however, the generator armature DG will supply current to the main field winding F in the same direction as before, thus effecting a reversal of the current in the armature DG and in the field winding 23ª.

The ensuing differential action between the dynamotor field windings produces a relatively weak field flux in the machine, with a corresponding increase of speed to effect a predetermined energization of the main field winding F. When supply-circuit energy is resumed, the current through the generator will reverse again, and, since the dynamotor is running at a relatively high speed, the voltage across the field winding F at the time will be sufficiently high to effect a rapid building up of the main field flux to its normal value.

I do not wish to be restricted to the specific circuit connections or arrangement of parts herein set forth, as various further modifications may be made within the spirit and scope of my invention. I desire, therefore, that only such limitations shall be imposed as are indicated in the appended claims.

I claim as my invention:

1. In a system of control, the combination with a supply circuit and a main dynamo-electric machine having an armature and a field winding, of a dynamotor normally driven from said supply circuit and connected to said field winding, the windings of said dynamotor being inherently adapted to quickly readjust the main field-excitation upon a predetermined variation of main-armature current.

2. In a system of control, the combination with a supply circuit and a main dynamo-electric machine having an armature and a field winding, of a plurality of mechanically-connected auxiliary armatures respectively connected to excite said field winding and to be normally driven from said supply circuit, and a plurality of field windings for said auxiliary armatures normally cumulatively related, said auxiliary armatures being driven from said main armature in the event of a failure of supply-circuit energy to produce a differential relation of the auxiliary field windings.

3. In a system of control, the combination with a supply circuit and a main dynamo-electric machine having an armature and a field winding, of an auxiliary dynamo-electric machine receiving energy from the supply circuit under normal operating conditions, and means dependent upon an interruption of supply-circuit energy for operating the auxiliary machine as a generator to furnish exciting energy to said field winding.

4. In a system of control, the combination with a supply circuit and a main dynamo-electric machine having an armature and a field winding, of an auxiliary dynamo-electric machine for furnishing energy to said field winding, and means dependent upon a predetermined change of main-circuit conditions for effecting a reversal of current in a field winding of said auxiliary machine.

5. In a system of control, the combination with a supply circuit and a main dynamo-electric machine having an armature and a field winding, of a dynamotor normally driven from said supply circuit and having a field winding connected through the generator armature to said main field winding, and means dependent upon an interruption of supply-circuit energy for effecting a reversal of current in said dynamotor field winding.

In testimony whereof, I have hereunto subscribed my name this 22nd day of Dec. 1917.

RUDOLF E. HELLMUND.